United States Patent [19]

Benjamin

[11] 3,877,832
[45] Apr. 15, 1975

[54] LOCKING MEANS FOR ADJUSTABLE BORING BAR INSERTS AND THE LIKE

[75] Inventor: Milton L. Benjamin, Chagrin Falls, Ohio

[73] Assignee: Erickson Tool Company, Solon, Ohio

[22] Filed: Nov. 2, 1973

[21] Appl. No.: 412,203

[52] U.S. Cl. .................................. 408/155; 408/238
[51] Int. Cl. ............................................ B23b 29/02
[58] Field of Search ........... 408/153, 154, 181, 155, 408/185, 238, 239, 714, 186, 197, 198; 403/362; 151/24; 279/83

[56] References Cited
UNITED STATES PATENTS

| 473,818 | 4/1892 | Binns | 403/362 X |
|---|---|---|---|
| 2,537,517 | 1/1951 | DeVlieg | 408/153 |
| 2,669,890 | 2/1954 | Tao | 408/153 |

Primary Examiner—Andrew R. Juhasz
Assistant Examiner—Z. R. Bilinsky
Attorney, Agent, or Firm—Donnelly, Maky, Renner & Otto

[57] ABSTRACT

A locking means for an adjustable boring bar insert of the type wherein the cutter element has a shank portion which is axially slidably keyed in a bore of the boring bar and is axially adjusted by a rotary, axially fixed dial member which has threaded engagement with said cutter element, said locking means being characterized in that it imposes a torque force on the cutter element which effects firm frictional locking engagement of one side of a cutter element key with the adjacent side of the keyway in the bore of the boring bar whereby in use of the boring bar-insert assembly the cutter element is solidly locked in precise adjusted position against chattering or like movements even during the making of heavy cuts to result in a precision boring operation. A further characterizing feature of the locking means herein is that the locking of the cutter element as aforesaid is effective to maintain firm frictional locking engagement of the adjusting dial member in engagement with a boring bar seat so that precision adjustment of the cutter element is maintained during use of the boring bar-insert assembly.

6 Claims, 5 Drawing Figures

LOCKING MEANS FOR ADJUSTABLE BORING BAR INSERTS AND THE LIKE

BACKGROUND OF THE INVENTION

It is old and well known to employ set screws to hold collars, sheaves, gears, etc., on shafts against rotational forces, the torsional holding power being substantially directly proportional to the seating torque in the case of cup, flat, and oval point set screws. In the case of cone and dog point set screws, they are usually spotted in holes in the shafts to provide increased torsional holding power developed by the shear strength across the cone point or dog point. When a set screw is used in combination with a key, the set screw diameter is generally made equal to the width of the key and in this combination the set screw is locating the parts in an axial direction with torsional load on the parts being carried by the key. It is also known to provide two or more set screws bearing on a shaft to provide increased torsional holding power with the set screws being radially disposed in axially aligned spaced relation or in circumferentially aligned, angularly spaced relation.

Aside from the foregoing well-known use of set screws for axially holding keyed parts together it is known from the following patents to provide a cutting tool member which is axially slidably keyed in a bore of a boring bar or like tool support member and which is adjusted by means of a rotary, axially fixed dial member having threaded engagement with the shank of the tool member: De Vlieg U.S. Pat. Nos. 2,330,692, De Vlieg 2,537,517, Yogus et al., 3,178,969, Winnen 3,198,079, Benjamin et al., 3,313,187, Cook 3,347,115, Holloway 3,349,648, and Benjamin et al., 3,434,376. For sake of economy of manufacture and for interchangeability of one tool member for another, the tool member key will have a width-wise clearance in the tool supporting member keyway and hence, after adjustment of the tool member by turning of the adjusting dial member, the tool member upon imposition of heavy cutting loads thereon may be subject to chattering or slight rotary movements as permitted by the key and keyway clearance aforesaid which may result in defects or inaccuracies in the bored hole of the workpiece.

In the afore-mentioned patents, the dial member is seated against the tool supporting member either by spring pressure or by locking screw means which draws the tool member, and thus the dial member, into frictional seating engagement with the tool supporting member. In the latter case, the precision adjustment of the tool member requires repeated manipulation of the locking screw means and adjusting dial member.

SUMMARY OF THE INVENTION

In contradistinction to known ways of employing set screws to prevent rotation of a shaft-like member wherein the set screw acts along a line passing through the axis of the shaft or acts on the key of a keyed shaft to axially retain the shaft relative to the member being locked thereto, it is a principal object of this invention to provide a locking means for adjustable boring bar inserts and the like which is of simple form and highly effective to firmly lock the radially adjustable cutter member in precise adjusted position, the locking means herein being effective in conjunction with an axially slidably keyed member to impose a torque force on said member which firmly presses one side of the key against the adjacent side of the keyway thus to lock the member against any rotary movement regardless of widthwise clearance between the key and the keyway.

It is another object of this invention to provide a locking means of the character indicated which is further effective to retain the adjusting dial member in its seated position against a seat of the boring bar.

It is yet another object of this invention to provide a locking means of the character indicated which, in conjunction with application of a torque locking force on the cutter member as aforesaid, is additionally effective to impose an axial force on the cutter member to draw the adjusting dial member tightly against the boring bar seat to provide additional resistance to turning of the adjusting dial member except upon release of the locking means from locking engagement with the cutter member.

Other objects and advantages of the present invention will appear in the ensuing description.

DETAIL DESCRIPTION OF THE PREFERRED EMBODIMENTS

Figure 1:
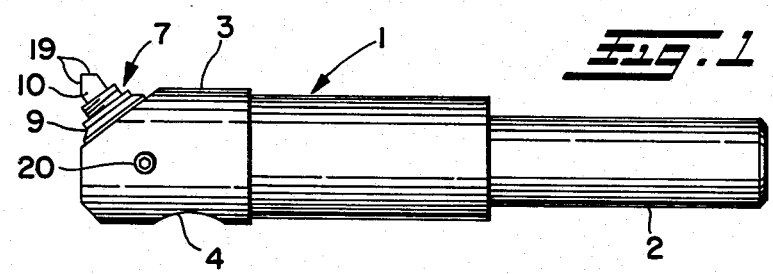
FIG. 1 is an elevation view of a boring bar embodying the present locking means in conjunction with the adjustable insert in said bar.
Figure 2:
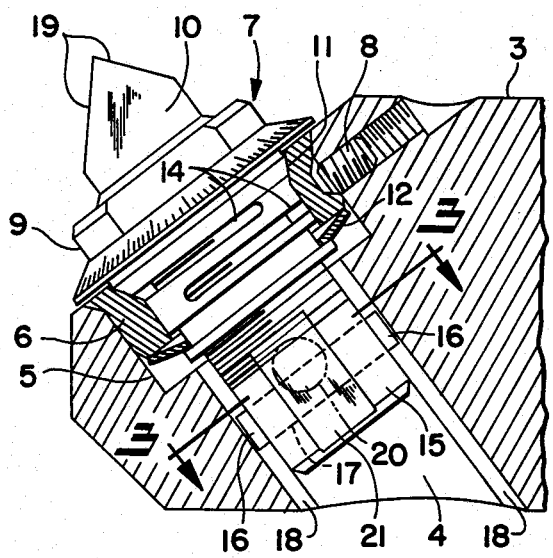
FIG. 2 is a fragmentary diametrical cross-section view on enlarged scale in a plane passing through the axis of the boring bar bore along which the cutter member is axially adjustable.

Referring first to FIGS. 1 and 2, the boring bar 1 has at one end a shank 2 and the other end portion 3 has a bore 4 therethrough disposed at an angle with respect to the longitudinal axis of the boring bar 1. A counterbore 5 at one end of said bore 4 receives the ring member 6 of a boring bar insert assembly 7 which is removably retained in the boring bar 1 by a set screw 8, said insert assembly 7 preferably being of the type illustrated in Benjamin et al., U.S. Pat. No. 3,434,376 which comprises an adjusting dial member 9 having threaded engagement with the cutter member 10. The adjusting dial member 9 is resiliently seated against the conical seat 11 of the ring member 6 as by means of the Belleville spring 12, and as disclosed in said Benjamin et al., patent, the spring 12 is effective to take up play between the dial member 9 threads and the cutter member 10 threads by reason of the provision of the slots 14 in the intermediate portion of the dial member 9.

The cutter member 10 has its radially inner shank portion 15 closely slidably fitted in the bore 4 and has keys 16 formed by the end portions of the cross pin 17 therein movable in keyways 18 in said bore 4 to prevent rotation of the cutter member 10 when the adjusting dial member 9 is rotated to move the cutter member 10 radially outwardly or inwardly. The cutter member 10 has cutting edges 19 which may be a part of the cutter member 10 itself or which may be on an insert brazed on the cutter member 10 or which may be on a replaceable throwaway insert of tungsten carbide or the like removably clamped to the cutter member 10 as well known in the art (see for example the patent to Faber et al., U.S. Pat. No. 3,697,187).

It is to be understood that the keys 16 instead of being the end portions of a cross pin 17 as herein illustrated may comprise a conventional square key in a key seat of the cutter member 10, a Woodruff key in a key seat in the cutter member 10, etc.

As aforesaid, the shank portion 15 of the cutter member 10 is a close sliding fit in the boring bar bore 4 and such diameters may readily be held to close tolerances to provide such sliding fit while preserving interchangeability of insert assemblies 7 or cutter members 10 in different boring bar bores. However, keyways in bores are generally formed by broaching and hence to avoid need of holding extremely close tolerances with respect to key and keyway widths and locations the allowance may be 0.002 inch or more and hence with ordinary locking means the cutter member 10 may chatter when heavy cuts are made.

Figure 3:
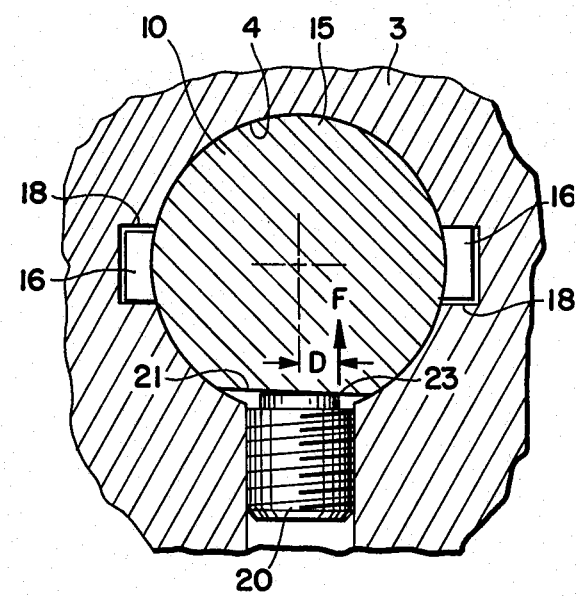
FIG. 3 is a cross-section view on yet larger scale taken substantially along the line 3—3, FIG. 2.

In order to securely lock the cutter member 10 in its adjusted position, the locking screw 20 in the boring bar 1 as shown in FIG. 3 bears on an inclined flat 21 on the cutter member 10 at a point 23 which is eccentric of the cutter member axis to thereby impose a torque moment FD on the cutter member 10 to rotate the cutter member 10 in bore 4 to effect firm engagement of one side of at least one key 16 with the adjacent side of the keyway 18. When adjusting the cutter member 10 it is preferred that the locking screw 20 be backed off only sufficiently to permit rotation of the dial member 9 while the key-keyway engagement is retained. When the lock screw 20 tightening is in clockwise direction as viewed in FIGS. 1 and 3, it imposes an axial force at point 23 on the cutter member 10 to tend to more tightly draw the dial member 9 against the seat 11. In this way not only is the cutter member 10 securely locked in place as aforesaid, but also the adjusting dial member 9 is firmly locked in seated engagement with the seat 11.

Figure 4:
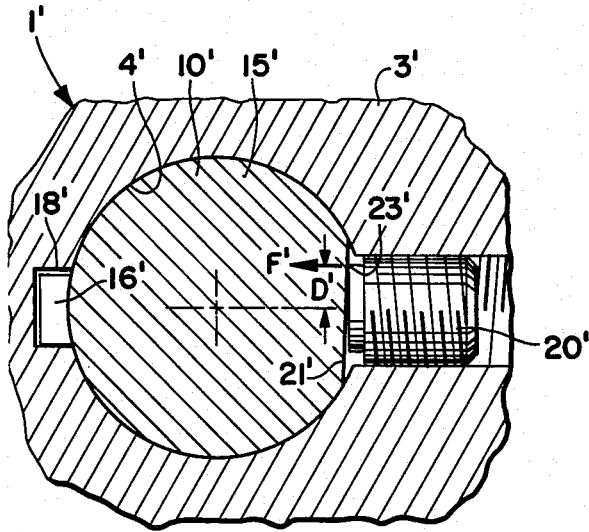
FIG. 4 is a cross-section view similar to FIG. 3 except showing the invention as applied to a cutter member having a single key disposed in a single keyway of the boring bar bore.

FIG. 4 is a cross-section view similar to FIG. 3 except showing a lock screw 20' in association with a cutter member 10' and boring bar 1' having a single key 16' and keyway 18' and as apparent the lock screw 20' and inclined flat 21' may be located anywhere around the axis of the bore 4' and will yet impose a torque moment F'D' for firmly seating one side of the key 16' against the adjacent side of the keyway 18'.

Figure 5:
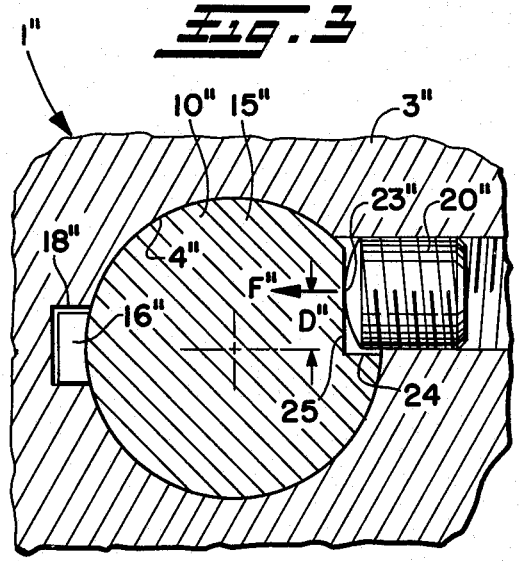
FIG. 5 is a cross-section view similar to FIG. 4 illustrating yet another embodiment of the present invention.

In FIG. 5 the lock screw 20'' is located eccentrically of the axis of bore 4'' and bears on one side of an axially elongated notch 24 in the cutter member 10'' to impose a torque moment F''D'' on the latter for firmly seating one side of the key 16'' against the adjacent side of the keyway 18''. In this case, the point 23'' coincides with the axis of the lock screw 20'' but obviously the side 25 of notch 24 may be inclined with respect to a flat end lock screw 20 or 20' as in FIGS. 1 to 4 to increase the moment arm D'' and to obtain axial drawing in action on the cutter member 10'' and dial member 9''.

The embodiments of the invention in which an exclusive property or privilege is claimed are defined as follows:

1. A boring bar having a bore with at least one longitudinal keyway; a cutter member having an outer portion with cutting edges thereon and an inner portion axially slidably fitted in said bore and having a key disposed in said keyway to prevent rotation of said cutter member; a ring-like adjusting dial member having threaded engagement with said cutter member and being secured to said bar for rotation about the axis of said bore while being restrained against axial movement whereby rotation of said dial member effects axial adjusting movement of said cutter member; and lock screw means in said bar bearing on said cutter member to impose a torque force thereon to frictionally engage one side of said key with the adjacent side of said keyway; said cutter member inwardly of said dial member having a surface portion which is engaged by said lock screw means eccentrically of the axis of said cutter member and bore.

2. The boring bar of claim 1 wherein the engagement of said lock screw means with said surface portion is also eccentrically of the axis of said lock screw means so as to impose an axial inward force on said cutter member which through the threaded engagement thereof with said dial member frictionally locks the latter against said bar.

3. A boring bar having a bore with at least one longitudinal keyway; a cutter member having an outer portion with cutting edges thereon and an inner portion axially slidably fitted in said bore and having a key disposed in said keyway to prevent rotation of said cutter member; a ring-like adjusting dial member having threaded engagement with said cutter member and being secured to said bar for rotation about the axis of said bore while being restrained against axial movement whereby rotation of said dial member effects axial adjusting movement of said cutter member; and lock screw means in said bar bearing on said cutter member to impose a torque force thereon to frictionally engage one side of said key with the adjacent side of said keyway; said lock screw means being radially movable into engagement with the side of said cutter member at a point circumferentially spaced from said key thereof, said cutter member having a longitudinally extending flat thereon which is engaged by a portion of the radially inner end of said lock screw means which is radially spaced from the axis of said lock screw means.

4. The boring bar of claim 3 wherein turning of said lock screw means to effect frictional locking of said key with said keyway further effects drawing of said cutter member axially inwardly to cause, through the threaded engagement thereof with said dial member, frictional engagement of the latter with said bar further to lock said dial member against rotation.

5. In a tool assembly such as a boring bar wherein a cutter member is axially slidably keyed in a bore of said bar and wherein axial adjustment of said cutter member is effected by rotation of an axially retained adjusting dial member having threaded engagement with said cutter member, the improvement which comprises lock screw means in said bar disposed transverse to said cutter member to engage a side surface portion of the latter eccentrically of the axis of said dial member and said cutter member whereby said lock screw means is operative, when tightened, to impose a torque load on said cutter member to frictionally engage one side of a key of said cutter member with a longitudinal keyway in said bore.

6. The tool assembly of claim 5 wherein said lock screw means has an end surface radially spaced from the axis of said lock screw means thus engaged with said side surface portion whereby said lock screw means, when tightened, is further effective to tend to urge said cutter member axially to frictionally seat said dial member against said bar to prevent rotation thereof except upon loosening of said lock screw means to release said dial member for rotation and to release the frictional engagement of said key with said keyway for consequent axial adjustment of said cutter member pursuant to rotation of said dial member.

* * * * *